(12) United States Patent
Jomori et al.

(10) Patent No.: US 9,696,158 B2
(45) Date of Patent: Jul. 4, 2017

(54) GYRO SENSOR AND COMPOSITE SENSOR COMPRISING GYRO SENSOR

(71) Applicants: DENSO CORPORATION, Kariya, Aichi-pref. (JP); Kyoto University, Kyoto-shi, Kyoto-pref. (JP)

(72) Inventors: Tomoya Jomori, Kariya (JP); Toshiyuki Tsuchiya, Kyoto (JP)

(73) Assignees: DENSO CORPORATION, Kariya (JP); Kyoto University, Kyoto-shi (JP)

( * ) Notice: Subject to any disclaimer, the term of this patent is extended or adjusted under 35 U.S.C. 154(b) by 96 days.

(21) Appl. No.: 14/646,920

(22) PCT Filed: Nov. 27, 2013

(86) PCT No.: PCT/JP2013/006956
§ 371 (c)(1),
(2) Date: May 22, 2015

(87) PCT Pub. No.: WO2014/083843
PCT Pub. Date: Jun. 5, 2014

(65) Prior Publication Data
US 2015/0308828 A1 Oct. 29, 2015

(30) Foreign Application Priority Data

Nov. 29, 2012 (JP) .................................. 2012-261335
Sep. 3, 2013 (JP) .................................. 2013-182150

(51) Int. Cl.
*G01C 19/00* (2013.01)
*G01C 19/574* (2012.01)
(Continued)

(52) U.S. Cl.
CPC ....... *G01C 19/574* (2013.01); *G01C 19/5705* (2013.01); *G01C 19/5712* (2013.01); *G01C 19/5747* (2013.01)

(58) Field of Classification Search
CPC ............ G01C 19/5702; G01C 19/5712; G01C 19/5719; G01C 19/5733; G01C 19/574; G01C 19/5747
(Continued)

(56) References Cited

U.S. PATENT DOCUMENTS 6,158,280 A * 12/2000 Nonomura ......... G01C 19/5719
73/504.04
6,349,597 B1 2/2002 Folkmer et al.
(Continued)

FOREIGN PATENT DOCUMENTS

JP H10-10148 A 1/1998
JP 2006-242730 A 9/2006
(Continued)

OTHER PUBLICATIONS

International Search Report of the International Searching Authority mailed Dec. 24, 2013 in the corresponding PCT application No. PCT/JP2013/006956 (with English translation).
(Continued)

*Primary Examiner* — Benjamin Schmitt
(74) *Attorney, Agent, or Firm* — Posz Law Group, PLC

(57) ABSTRACT

In a gyro sensor, two detection weights are placed in an outer drive weight to be arranged in an x-axis direction and coupled to each other via a coupling spring. By thus coupling the two detection weights via the coupling spring, it is possible to separate an in-phase-mode resonant frequency fin and an anti-phase-mode resonant frequency fanti from each other. As a result, it is possible to provide the gyro sensor which can suppress an output error on receiving an impact and perform more precise angular velocity detection.

14 Claims, 10 Drawing Sheets

(51) Int. Cl.
*G01C 19/5712* (2012.01)
*G01C 19/5747* (2012.01)
*G01C 19/5705* (2012.01)

(58) Field of Classification Search
USPC .......................... 73/504.02, 504.12, 504.15
See application file for complete search history.

(56) References Cited

U.S. PATENT DOCUMENTS

| | | | |
|---|---|---|---|
| 6,378,369 B1 * | 4/2002 | Takata | G01C 19/5719 73/504.12 |
| 6,443,008 B1 | 9/2002 | Funk et al. | |
| 2002/0088279 A1 | 7/2002 | Folkmer et al. | |
| 2007/0266785 A1 * | 11/2007 | Cadarelli | G01C 19/5719 73/504.16 |
| 2008/0276706 A1 | 11/2008 | Hartmann et al. | |
| 2010/0037690 A1 | 2/2010 | Gunthner et al. | |
| 2011/0056292 A1 | 3/2011 | Jomori et al. | |
| 2013/0270659 A1 | 10/2013 | Jomori et al. | |

FOREIGN PATENT DOCUMENTS

| | | | |
|---|---|---|---|
| JP | 2012-145493 A | 8/2012 | |
| WO | 2012/004825 A1 | 1/2012 | |
| WO | 2012/004979 A1 | 1/2012 | |

OTHER PUBLICATIONS

Written Opinion of the International Searching Authority mailed Dec. 24, 2013 in the corresponding PCT application No. PCT/JP2013/006956 (with English translation).

* cited by examiner

RESTING STATE

IN-PHASE MODE (fin)

ANTI-PHASE MODE (fanti)

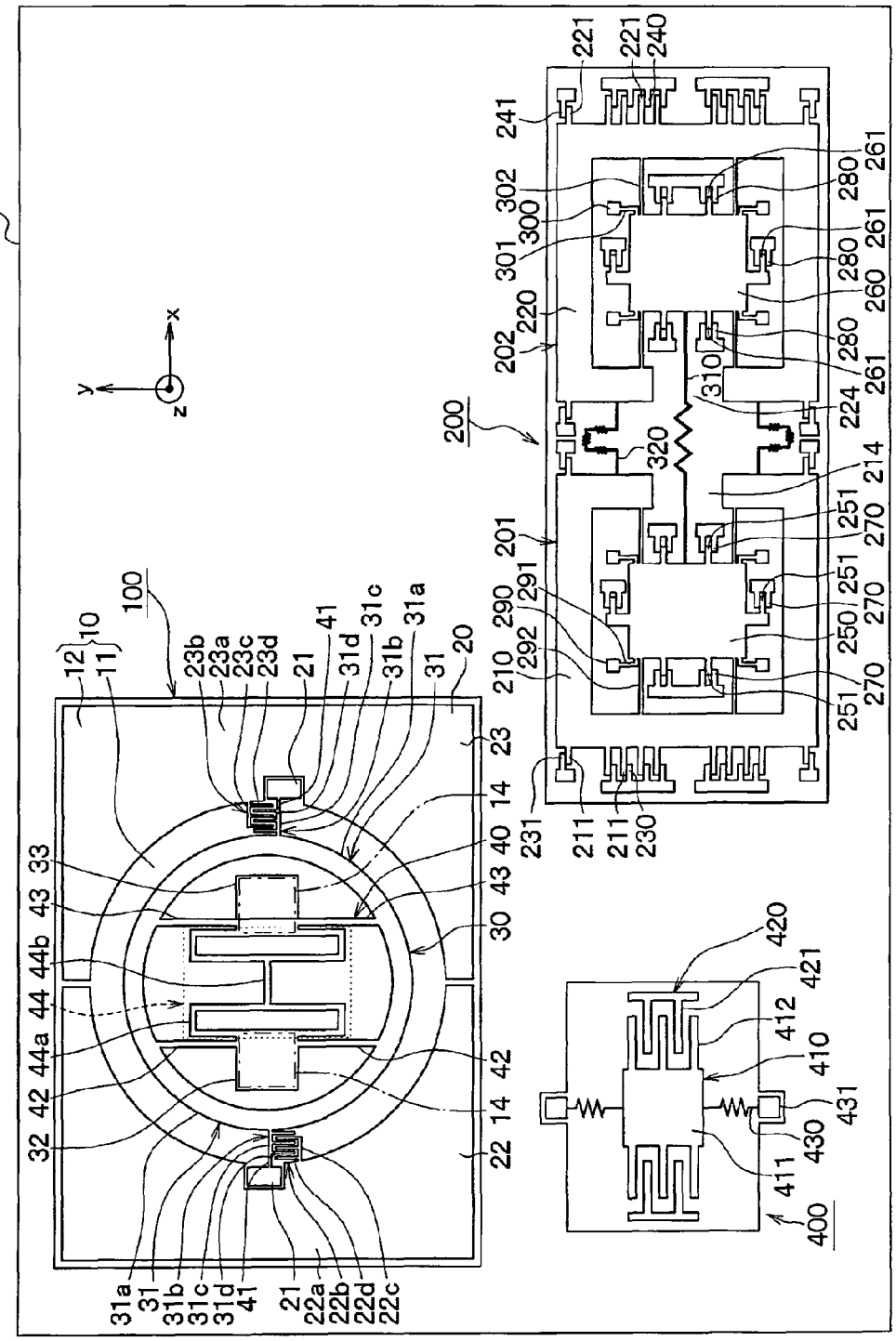

GYRO SENSOR AND COMPOSITE SENSOR COMPRISING GYRO SENSOR

CROSS REFERENCE TO RELATED APPLICATIONS

This application is a U.S. national stage application of PCT/JP2013/006956 filed on Nov. 27, 2013 and is based on Japanese Patent Application No. 2012-261335 filed on Nov. 29, 2012 and Japanese Patent Application No. 2013-182150 filed on Sep. 3, 2013, the disclosures of which are incorporated herein by reference.

TECHNICAL FIELD

The present disclosure relates to a gyro sensor which performs angular velocity detection by driving/vibrating detection weights in an in-plane direction (xy plane direction) of a substrate and moving the detection weights in a direction perpendicular to the substrate (hereinafter referred to as a z-axis direction) with the application of the angular velocity and a composite sensor comprising the gyro sensor.

BACKGROUND ART

Conventionally, as a sensor used to detect an angular velocity, a gyro sensor as shown in, e.g., Patent Literature 1 has been known. The gyro sensor of this type has a drive weight which is vibrated in an in-plane direction of a substrate, and detection weights each connected to the drive weight via a detection spring. The gyro sensor performs angular velocity detection on the basis of such a mechanism that, while the drive weight is driven/vibrated, the detection weights are vibrated in a direction perpendicular to the substrate by the application of an angular velocity. The gyro sensor shown in Patent Literature 1 has a structure in which the drive weight and the detection weights are arranged in the form of a disk. During the detection of the angular velocity, the drive weight is vibrated so as to cause oscillation around the center of the disk, thus allowing angular velocity detection to be performed. That is, on the basis of the application of the angular velocity, the detection weights facing each other on both left and right sides of the disk center are vertically vibrated in a seesaw manner in a direction (z-axis direction) perpendicular to a disk plane. Accordingly, by obtaining a differential output based on the vertical vibration on the left and right sides, angular velocity detection is performed.

PRIOR ART LITERATURE

Patent Literature

Patent Literature 1: JP 2001-255153 A

SUMMARY OF INVENTION

However, in a gyro sensor as shown in Patent Literature 1, a problem arises in that, when the gyro sensor receives an impact in the z-axis direction, an output error increases. Specifically, when the gyro sensor receives an impact in the z-axis direction, the detection weights are moved in the z-axis direction on the both left and right sides of the center of the disk. At this time, when the detection weights move in synchronization with each other on the both left and right sides, impact vibration components in respective operation outputs cancel out each other when the outputs are collected to result in no problem. However, when the detection weights do not move in synchronization, the impact vibration components emerge as a large output error. When such a large output error has occurred, precise angular velocity detection cannot be performed, and it is thus undesirable.

In view of the above-described point, an object of the disclosure is to provide a gyro sensor which can suppress an output error on receiving an impact and can perform more precise angular velocity detection.

According to a first aspect of the present disclosure, a gyro sensor has a substrate, a movable portion, two detection weights, a coupling spring, and detection electrodes. The substrate includes a fixed portion. The movable portion is connected to the fixed portion via a support beam. A plane parallel with a planar surface of the substrate and including an x-axis and a y-axis orthogonal to the x-axis is referred to as an xy plane. A direction along the x-axis is referred to as an x-axis direction. A direction along the y-axis is referred to as a y-axis direction. The movable portion includes a drive weight having a mass portion. When an angular velocity is detected, the mass portion is reciprocally rotationally vibrated in the xy plane or reciprocally vibrated in the y-axis direction, on the basis of a displacement of the support beam. The detection weights are connected to the drive weight via respective detection beams. The two detection weights are arranged in the x-axis direction and coupled by the coupling spring. The detection electrodes are placed to be spaced apart at predetermined distances from the two detection weights in a z-axis direction along a z-axis perpendicular to the xy plane.

In the gyro sensor thus configured, as a result of an application of the angular velocity, the two detection weights are vibrated oppositely in the z-axis direction to cause changes in the respective distances between the two detection weights and the detection electrodes. This causes anti-phase changes in capacitance values of two capacitors formed between the two detection weights and the detection electrodes and, on the basis of the anti-phase changes in the capacitance values, the angular velocity is detected using a differential output of signals showing the changes in the two capacitance values.

Since the two detection weights are coupled to each other via the coupling spring, the two detection weights are allowed to move in synchronization. This can surely provide two pattern movements in an in-phase mode and in an anti-phase mode. In addition, since the two detection weights move in synchronization, the two detection weights can have an in-phase-mode resonant frequency fin and an anti-phase-mode resonant frequency fanti. The in-phase-mode resonant frequency fin and the anti-phase-mode resonant frequency fanti can also be separated from each other on the basis of the settings of the individual portions. As a result, it is possible to provide the gyro sensor which can suppress an output error on receiving an impact and can perform more precise angular velocity detection.

According to a second aspect of the present disclosure, a gyro sensor has a substrate, a movable portion, two drive weights, a coupling spring, and detection electrodes. The substrate includes a fixed portion. The movable portion is connected to the fixed portion via detection beams, and includes detection weights each having a mass portion. A plane parallel with a planar surface of the substrate and including an x-axis and a y-axis orthogonal to the x-axis is referred to as an xy plane. A direction along the x-axis is referred to as an x-axis direction. A direction along the y-axis is referred to as a y-axis direction. When an angular velocity is detected, the mass portion is reciprocally rotationally vibrated in the xy plane or reciprocally vibrated in the y-axis direction on the basis of a displacement of the detection beam. The drive weights are formed integrally with the detection weights and arranged in the x-axis direction. The coupling spring couples the two detection weights to each other. The detection electrodes are placed to be spaced apart at predetermined distances from the two detection weights in a z-axis direction along a z-axis perpendicular to the xy plane. That is, the gyro sensor has a structure in which the two detections weights are formed integrally with the drive weights and arranged in the x-axis direction. In the gyro sensor having such a structure also, the same effect as obtained in the gyro sensor according to the first aspect can be obtained.

According to a third aspect of the present disclosure, a composite sensor has the gyro sensor according to the first or second aspect as a first gyro sensor, a second gyro sensor formed on the substrate to detect an angular velocity around the z-axis in the xy plane, and an acceleration sensor formed on the substrate to detect an acceleration in one direction parallel with the xy plane. The first gyro sensor, the second gyro sensor, and the acceleration sensor are integrated in one chip.

By thus using the gyro sensor according to the first or second aspect as the first gyro sensor, the first gyro sensor, the second gyro sensor, and the acceleration sensor can be integrated into one chip to provide the composite sensor. This allows the composite sensor to be more simplified than in the case where the individual sensors are formed in different chips.

BRIEF DESCRIPTION OF DRAWINGS

The above and other objects, features and advantages of the present disclosure will become more apparent from the following detailed description made with reference to the accompanying drawings, in which:

FIG. 14 is a plan diagram of a composite sensor according to a fourth embodiment of the present disclosure.

DESCRIPTION OF EMBODIMENTS

Figure 1:
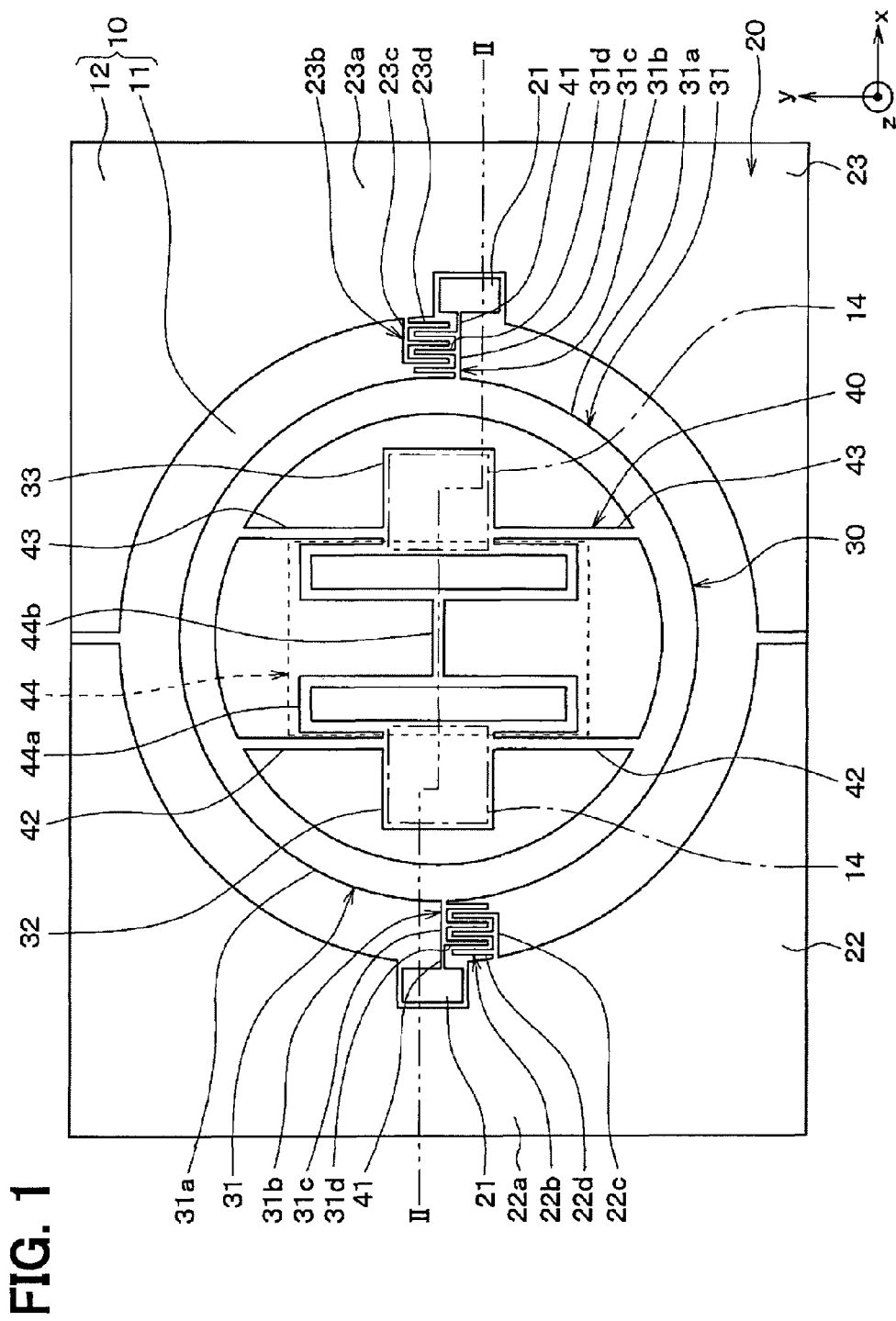
FIG. 1 is a plan diagram of a gyro sensor according to a first embodiment of the present disclosure.

The following will describe the embodiments of the present disclosure on the basis of the drawings. In the following description of the various embodiments, like reference characters or numerals designate like or equivalent component parts.

First Embodiment

The first embodiment of the present disclosure will be described. A gyro sensor described in the present embodiment is a sensor for detecting an angular velocity as a physical quantity. The gyro sensor is used to detect, e.g., a rotational angular velocity around a center axis parallel with the vertical direction of a vehicle, but can obviously be used appropriately for a purpose other than use in a vehicle.

The gyro sensor is mounted in a vehicle such that a normal direction to the surface of a paper sheet with FIG. 1 coincides with the vertical direction of a vehicle. As shown in FIG. 1, the gyro sensor is formed on one surface of a plate-like substrate 10. As shown in, e.g., FIG. 2, the substrate 10 is formed of a SOI (Silicon on insulator) substrate having a structure in which an embedded oxide film 13 serving as a sacrificial layer is interposed between a support substrate 11 and a semiconductor layer 12. Such a sensor structure is formed by etching the semiconductor layer 12 into the pattern of a sensor structure, then partially removing the embedded oxide film 13, and releasing a part of the sensor structure to provide a floating state.

Note that the following description will be given on the assumption that a direction in a plane parallel with the top surface of the semiconductor layer 12 which is a lateral direction along the surface of the paper sheet is an x-axis direction, a vertical direction along the surface of the paper sheet which is orthogonal to the x-axis direction is a y-axis direction, and a direction perpendicular to a surface of the semiconductor layer 12 is a z-axis direction. In other words, it is assumed that a plane parallel with a planar surface of the substrate 10 and including an x-axis and a y-axis which are orthogonal to each other is an xy plane, a direction along the x-axis is the x-axis direction, and a direction along the y-axis is the y-axis direction. It is also assumed that an axis perpendicular to the x-axis and the y-axis, i.e., axis perpendicular to the xy plane is a z-axis, and a direction along the z-axis is the z-axis direction.

As shown in FIG. 1, the semiconductor layer 12 has been patterned into a fixed portion 20, a movable portion 30, and a beam portion 40. The fixed portion 20 has the embedded oxide film 13 left on at least a part of the back surface thereof. The fixed portion 20 is in a state fixed to the support substrate 11 via the embedded oxide film 13 without being released from the support substrate 11. The movable portion 30 and the beam portion 40 form a vibrator in the gyro sensor. From the back surface of the movable portion 30, the embedded oxide film 13 has been removed. The movable portion 30 has been released from the support substrate 11 into a floating state. The beam portion 40 supports the movable portion 30. To perform angular velocity detection, the beam portion 40 drives/vibrates the movable portion 30 in the xy plane, while displacing a part of the movable portion 30 in the z-axis direction with the application of the angular velocity. A specific structure of the fixed portion 20, the movable portion 30, and the beam portion 40 will be described.

The fixed portion 20 has a configuration having supporting fixed portions 21 for supporting the movable portion 30, and driving fixed portions 22 and 23 to which driving voltages are applied.

The supporting fixed portions 21 are separated from, e.g., the other portion (driving fixed portions 22 and 23) of the fixed portion 20. The supporting fixed portions 21 are placed at symmetrical positions with respect to the movable portion 30 to support the movable portion 30 via support beams 41 as parts of the beam portion 40. In the present embodiment, the supporting fixed portions 21 are placed on both left and right sides of the movable portion 30 to support the movable portion 30 at two positions.

To the driving fixed portions 22 and 23, the driving voltages are applied. The driving fixed portions 22 and 23 are separate from each other and configured to be able to apply different potentials. The driving fixed portions 22 and 23 are configured to include base portions 22a and 23a, and comb-tooth-like driving fixed electrodes 22b and 23b.

In the present embodiment, the base portions 22a and 23a are placed so as to surround the periphery of a sensor structure such as the movable portion 30. The left half of the movable portion 30 in FIG. 1 is surrounded by the base portion 22a, while the right half of the movable portion 30 in FIG. 1 is surrounded by the base portion 23a. To the base portions 22a and 23a, the driving fixed electrodes 22b and 23b are connected. The driving fixed electrodes 22b and 23b are configured to be able to apply AC voltages (driving voltages) to the base portions 22a and 23a from the outside through bonding wires connected to bonding pads provided on the base portions 22a and 23a and not shown. By applying intended AC voltages to the base portions 22a and 23a, intended AC voltages can also be applied to the individual driving fixed electrodes 22b and 23b.

The driving fixed electrodes 22b and 23b are comb-tooth-like electrodes placed to face the individual comb-tooth portions of comb-tooth-like driving movable electrodes 31b provided in the movable portion 30. Specifically, the driving fixed electrodes 22b and 23b include a plurality of support portions 22c and 23c provided to extend in the x-axis direction, and a plurality of equi-spaced comb-tooth-like electrodes 22d and 23d provided to extend from the respective support portions 22c and 23c in the y-axis direction. The driving fixed electrodes 22b and 23b having such a structure are connected to the base portions 22a and 23a to be able to uniformly apply AC voltages to the plurality of comb-tooth-like electrodes 22d and 23d.

The fixed portion 20 is formed of such a structure. Here, the fixed portion 20 has a structure in which the base portions 22a and 23a are configured to surround the periphery of the sensor structure and the supporting fixed portions 21 are locally placed. However, the fixed portion 20 may also have another structure such that the base portions 22a and 23a are locally placed and the supporting fixed portions 21 are configured to surround the periphery of the sensor structure.

The movable portion 30 is a portion driven/vibrated in the detection of an angular velocity and displaced with the application of the angular velocity. The movable portion 30 is configured to have an outer drive weight 31, detection weights 32 and 33, and the like. The movable portion 30 has a layout in which the detection weights 32 and 33 are embedded in the outer drive weight 31 having a generally annular shape via parts of the beam portion 40.

The outer drive weight 31 is a drive weight placed outside the detection weights 32 and 33. The outer drive weight 31 is configured to have a mass portion 31a and the driving movable electrodes 31b.

The mass portion 31a is a portion forming the outer shape of the outer drive weight 31. The mass portion 31a is configured to have an annular shape. The mass portion 31a is placed along the inner wall surfaces of the driving fixed portions 22 and 23. The mass portion 31a functions as a weight and the outer drive weight 31 is configured to be rotatable around the z-axis about the center of the mass portion 31a as the rotation center.

The driving movable electrodes 31b are the comb-tooth-like electrodes placed to face the respective comb-tooth-like portions of the comb-tooth-like driving fixed electrodes 22b and 23b provided in the driving fixed portions 22 and 23. Specifically, the driving movable electrodes 31b include a plurality of support portions 31c provided to extend in the x-axis direction, and a plurality of equi-spaced comb-tooth-like electrodes 31d provided to extend from the respective support portions 31c in the y-axis direction. To the leading ends of the driving movable electrodes 31b having such a structure, the support beams 41 are connected. The support beams 41 are connected to the supporting fixed portions 21 to allow the movable portion 30 to be suspended in a floating state between the supporting fixed portions 21.

Each of the detection weights 32 and 33 has a flat plate shape. The detection weights 32 and 33 are supported inside the mass portion 31a via detection beams 42 and 43 as parts of the beam portion 40. Specifically, the detection weights 32 and 33 are arranged at symmetrical positions with respect to the center of the mass portion 31a to form a pair. In the present embodiment, the two detection weights are placed to be arranged in the x-axis direction. The detection weights 32 and 33 are respectively supported by the two detection beams 42 and 43 provided to extend on both sides of the y-axis direction. By bringing the positions where the detection beams 42 and 43 are connected closer to the end portions of the detection beams 32 in the mass portion 31a, preferably to the center-side end portions thereof, cantilever structures are provided. That is, while the individual detection weights 32 and 33 are supported by the two detection beams 42 and 43, the detection beam 42 is connected to the portions of the detection weight 32 which are located on one side of the detection weight 32 in the x-axis direction (closer to the center of the mass portion 31a) and the detection beam 43 is connected to the portions of the detection weight 33 which are located on one side of the detection weight 33 in the x-axis direction (closer to the center of the mass portion 31a). Accordingly, during the application of an angular velocity, the respective end portions of the detection weights 32 and 33 which are located on the side where the detection weights 32 and 33 are supported by the detection beams 42 and 43 (hereinafter referred to as a support side) serve as the nodes of vibration and are barely displaced, while the respective end portions of the detection weights 32 and 33 which are located on the opposite side (hereinafter referred to as a non-support side) can significantly be displaced.

Figure 2:
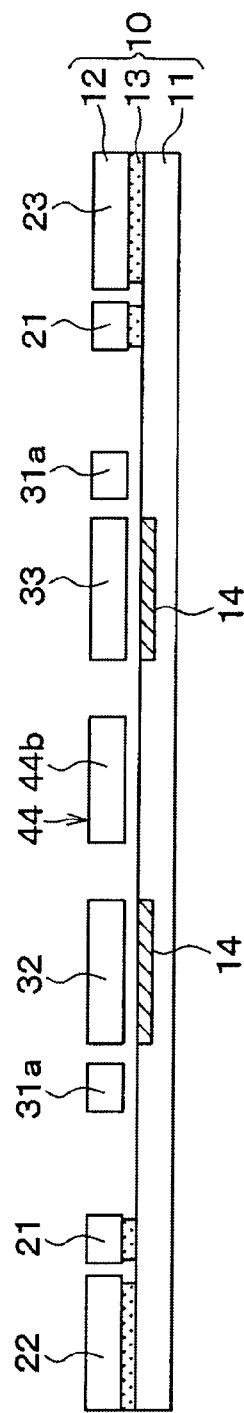
FIG. 2 is a cross-sectional diagram along the line II-II in FIG. 1.

Then, as shown in FIG. 2, at respective positions (the dot-dash lines in FIG. 1) in the surface of the semiconductor substrate 11 facing the semiconductor layer 12 which correspond to the detection weights 32 and 33, detection electrodes 14 are formed. During the application of an angular velocity, angular velocity detection is performed on the basis of the changing of the distances between the detection electrodes 14 and the weights 32 and 33.

Note that, in the present embodiment, each of the detection weights 32 and 33 is supported by the cantilever structure, as described above. This allows an S/N ratio to be improved. That is, it is also possible to provide a double-supported structure in which the detection beams 42 and 43 are placed on both sides of the detection weights 32 and 33 in the x-axis direction and thus provide a structure in which the detection weights 32 and 33 are displaced in parallel with the xy plane. However, when the double-supported structure is provided, the detection beams 42 and 43 serving as springs have a larger number of connected portions to increase resonant modes and also undesirably increase unneeded resonant modes. Therefore, it is preferable to support the detection weights 32 and 33 with a cantilever structure as used in the present embodiment.

The beam portion 40 is configured to have a coupling spring 44 in addition to the support beams 41 and the detection beams 42 and 43 each described above.

The support beams 41 support the movable portion 30 in a floating state relative to the substrate 10 and also function as springs which support the movable portion 30 such that the movable portion 30 is movable in the xy plane. In the present embodiment, the support beams 41 are structured to provide coupling between the leading ends of the support portions 31c of the driving movable electrodes 31b and the supporting fixed portions 21. The widths of the support beams 41 are reduced to be smaller than those of the support portions 31c to allow the support beams 41 to function as springs. However, the support beams 41 need not be coupled to the driving movable electrodes 31b. The support beams 41 may also be placed at positions different from those of the driving movable electrodes 31b.

The detection beams 42 and 43 are detection springs which connect the detection weights 32 and 33 to the mass portion 31a and allow the detection weights 32 and 33 to move integrally with the outer drive weight 31 in the xy plane and move independently of the outer drive weight 31 in the z-axis direction. In the present embodiment, each of the detection beams 42 and 43 is formed of a linear beam extended in the y-axis direction. The two detection beams 42 and the two detection beams 43 are placed individually on both sides of the detection weights 32 and 33 in a vertical direction along the surface of the paper sheet. The detection beams 42 and 43 are connected to the inner peripheral surface of the mass portion 31a. Of the detection beams 42 and 43, the portions connected to the detection weights 32 and 33 are particularly twisted to function as torsion springs (twisted springs). This allows the detection weights 32 and 33 to be supported on the support side, while allowing the detection weights 32 and 33 to be displaced on the non-support side.

The coupling spring 44 couples the two detection weights 32 and 33 and is configured to have turn-back beams 44a, and a middle rigid body 44b. By coupling the two detection weights 32 and 33 via the coupling spring 44, the detection weights 32 and 33 are allowed to move in synchronization.

The turn-back beams 44a form the torsion springs. The turn-back beams 44a are placed closer to the center of the mass portion 31a than the detection beams 42 and 43 on the support side of the two detection weights 32 and 33. Each of the turn-back beams 44a is formed of a beam turned back into a rectangular frame shape. The turn-back beams 44a are connected to the both support-side corner portions of the detection weights 32 and 33. Each of the turn-back beams 44a includes two sides parallel with the y-axis direction, and one side parallel with the x-axis. Of the turn-back beams 44a, the sides parallel with the y-axis direction are twisted to function as the torsion springs.

The middle rigid body 44b couples the two turn-back beams 44a to each other. In the present embodiment, the middle rigid body 44b is formed as a linear member and connected to the midpoints of the sides of the turn-back beams 44a parallel with the y-axis. The thickness of the middle rigid body 44b in the y-axis direction has been adjusted to be larger than the thickness of each of the turn-back beams 44a in the x-direction. Accordingly, during a sensor operation, the turn-back beams 44a are displaced, and the middle rigid body 44b couples the two turn-back beams 44a, while keeping a distance therebetween, without undergoing torsional deformation.

Such a structure as described above forms the gyro sensor having a structure in which the pair of detection weights 32 and 33 supported by the detection beams 42 and 43 are placed in the mass portion 31a, while being coupled to each other via the coupling spring 44.

Figure 3:
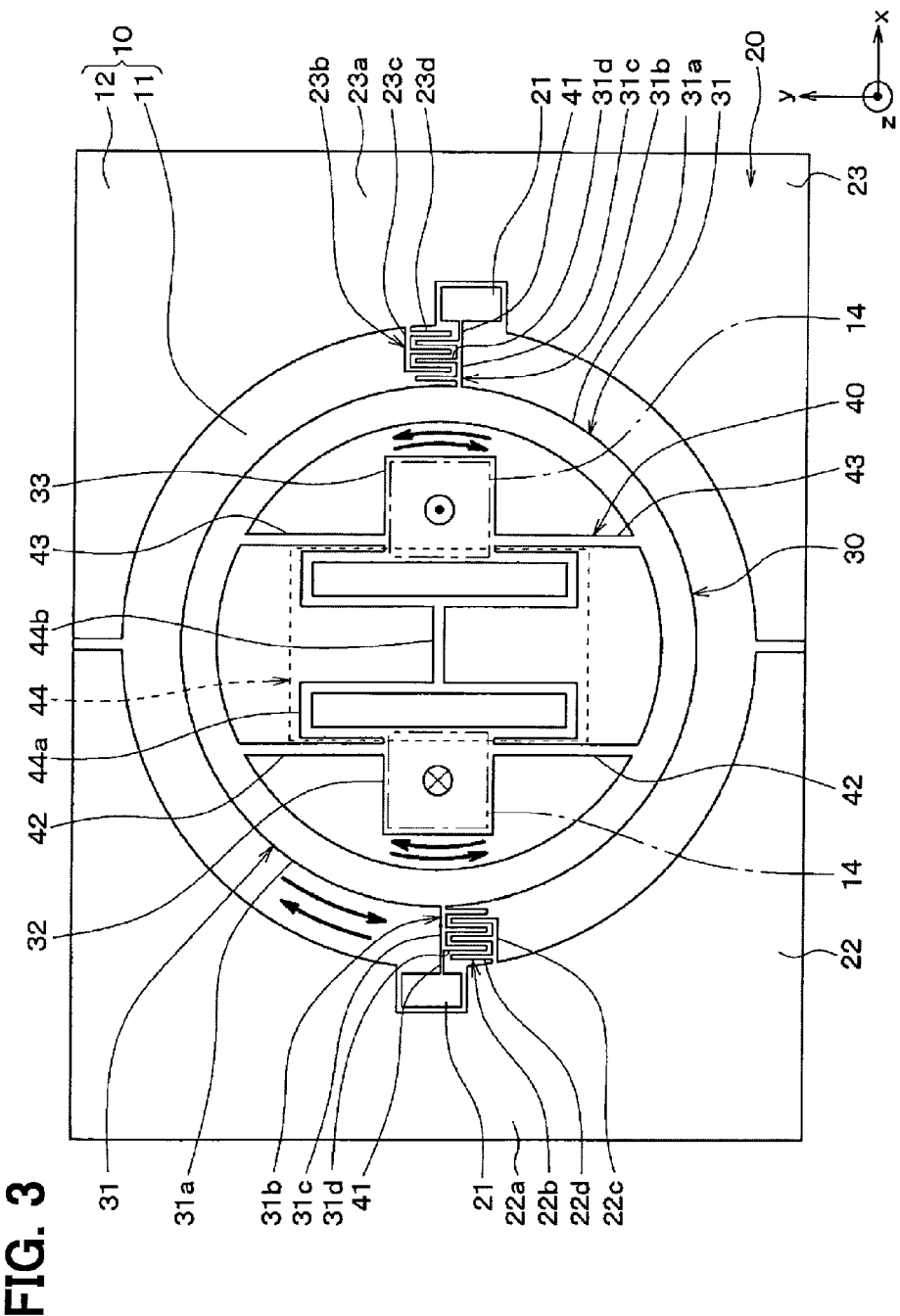
FIG. 3 is a schematic diagram showing the state of the gyro sensor during a basic operation.

Subsequently, a description will be given of the operation of the gyro sensor thus configured with reference to FIG. 3. In FIG. 3, the mark representing the circled solid circle shows vibration toward the other side of the vertical direction along the surface of the paper sheet and the mark representing the circled X shows vibration toward one side of the vertical direction along the surface of the paper sheet.

As shown in FIG. 3, during the detection of an angular velocity, the gyro sensor performs, as a basic operation, the operation of driving/vibrating the outer drive weight 31, which is the operation of reciprocally rotationally vibrating the outer drive weight 31 about the center of the mass portion 31a as the rotation center in the present embodiment. Specifically, AC voltages are applied to the driving fixed portions 22 and 23 to produce a potential difference between each of the driving fixed portions 22 and 23 and the outer drive weight 31. As a result, on the basis of the potential difference, electrostatic forces in the y-axis direction are generated between the driving fixed portions 22b and 23b and the driving movable electrodes 31b. On the basis of the electrostatic forces, the outer drive weight 31 is reciprocally rotationally vibrated about the center of the mass portion 31a as the rotation center. In addition, as shown by the arrows in FIG. 3, the detection weights 32 and 33 are vibrated in directions opposite to the direction of vibration of the outer drive weight 31. The gyro sensor monitors the vibration of the outer drive weight 31, while varying the frequencies of the AC voltages, and adjusts the frequencies of the AC voltages to intended drive resonant frequencies.

Thus, during the detection of the angular velocity, the gyro sensor performs the basic operation of driving/vibrating the movable portion 30.

When an angular velocity around the z-axis is applied to the gyro sensor while the gyro sensor is performing a basic operation as shown in FIG. 3 described above, by a Coriolis force, the detection weights 32 and 33 are displaced oppositely in the z-axis direction. The displacement changes the distances between the detection weights 32 and 33 and the detection electrodes 14 and changes the capacitance values of capacitors formed of the detection weights 32 and 33 and the detection electrodes 14. Since the distances between the detection weights 32 and 33 and the detection electrodes 14 change in accordance with the magnitude of the angular velocity, the capacitance values of the capacitors also change in accordance with the magnitude of the angular velocity.

Accordingly, by reading the changes in the capacitance values of the capacitors on the basis of signals retrieved through a wiring pattern that has been extracted from the detection electrodes 14 placed to face the respective detection weights 32 and 33 and not shown, the angular velocity can be detected. In the case of using a configuration as used in the present embodiment, a differential output is obtained from the signals retrieved from the pair of angular velocity detection structures using the pair of detection weights 32 and 33 and the detection electrodes 14. This allows the changes in the capacitance values of the capacitors to be read. As a result, it is possible to distinguishably detect the angular velocity and the acceleration.

Here, angular velocity detection is performed on the basis of a detection principle as described above. Since the two detection weights 32 and 33 are coupled to each other by the coupling spring 44, the detection weights 32 and 33 move in synchronization. Accordingly, the detection weights 32 and 33 move in an in-phase mode in which the detection weights 32 and 33 are vibrated unidirectionally in the z-axis direction and in an anti-phase mode in which the detection weights 32 and 33 are vibrated oppositely in the z-axis direction. As a result, the detection weights 32 and 33 have an in-phase-mode resonant frequency fin and an anti-phase-mode resonant frequency fanti, which will be described with reference to FIGS. 4A to 4C.

Figure 4A:
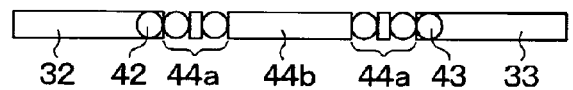
FIG. 4A is a schematic diagram showing the resting state of the detection unit of the gyro sensor.
Figure 4B:
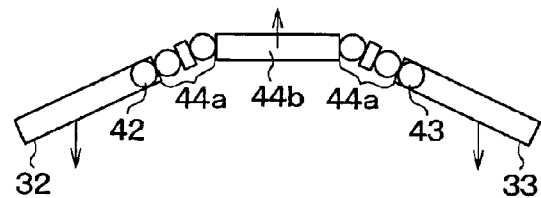
FIG. 4B is a schematic diagram showing the state of the detection unit of the gyro sensor in an in-phase mode.
Figure 4C:
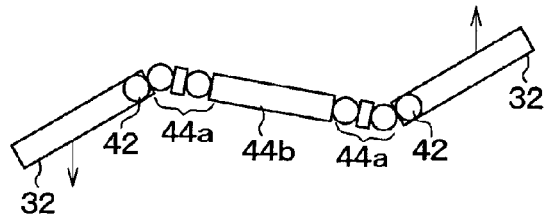
FIG. 4C is a schematic diagram showing the state of the detection unit of the gyro sensor in an anti-phase mode.

FIGS. 4A to 4C show schematic representations of the resting state of the gyro sensor according to the present embodiment and the states of the gyro sensor according to the present embodiment in the in-phase mode and in the anti-phase mode. That is, the detection weights 32 and 33 are supported by the detection beams 42 and 43 on the support side thereof and connected to the turn-back beams 44a and the middle rigid body 44b each included in the coupling spring 44 on the support side. The detection beams 42 and 43 and the portions of the frame beams 44a which are parallel with the y-axis serve as the torsion springs, among the detection weights 32 and 33, the detection beams 42 and 43, the turn-back beams 44a, and the middle rigid body 44b. In FIGS. 4A to 4C, the portions serving as the torsion springs are represented by the circle marks and the portions serving as the rigid body are represented by the rectangle marks. In the drawings, between the detection weights 32 and 33 and the middle rigid body 44b, each of the frame beams 44a is represented by the two circle marks and the one rectangle mark. Of each of the frame beams 44a, the two sides parallel with the y-axis serve as the torsion spring and the one side parallel with the x-axis serves as the rigid body.

In the resting state, as shown in FIG. 4A, the detection weight 32, the detection beams 42 and 43, and the coupling spring 44 are parallel with the xy plane. In the in-phase mode, as shown in FIG. 4B, the detection weights 32 and 33 located on the non-support side are each displaced in the same direction, while the middle rigid body 44b is displaced in a direction opposite to the direction of displacement of the detection weights 32 and 33. In the anti-phase mode, as shown FIG. 4C, the detection weights 32 and 33 located on the non-support side are displaced in opposite directions.

As described above, in a normal driving state, the detection weights 32 and 33 are displaced oppositely in the z-axis direction by a Coriolis force. Accordingly, the detection weights 32 and 33 are vibrated in the anti-phase mode. When an impact in the z-axis direction is applied to the gyro sensor and changes occur in the in-phase mode, respective signals retrieved from the pair of angular velocity detection structures are differentially amplified. Accordingly, the signals resulting from vibration based on the impact are cancelled out. However, when the impact is applied in the in-phase mode but the resonant frequency in the anti-phase mode, which is intrinsic to the gyro sensor, is located in the vicinity of the resonant frequency in the in-phase mode, excitation in the in-phase mode induces vibration in the anti-phase mode, which appears as an output error.

Figure 5:
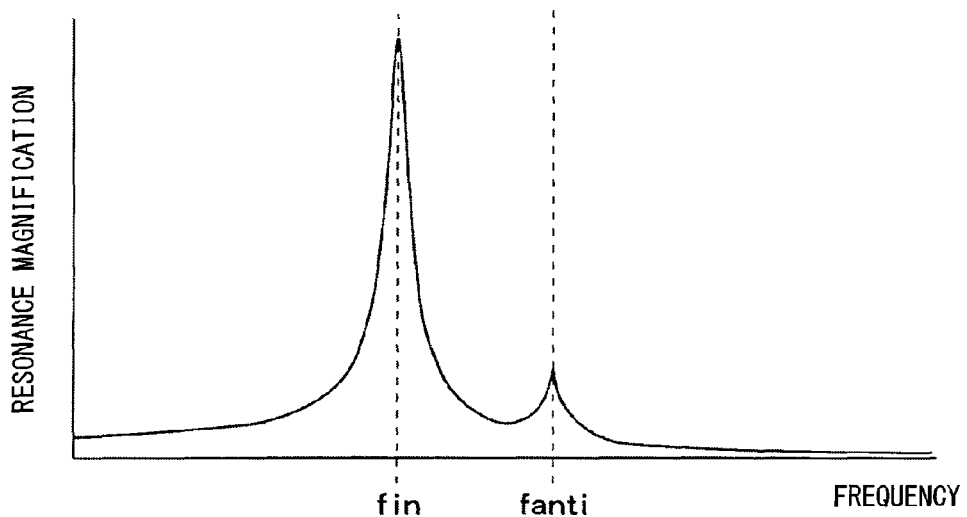
FIG. 5 is a diagram showing the frequency characteristic (response curve) of the resonance magnification of the gyro sensor.

When the gyro sensor receives the impact in the z-axis direction, a resonance magnification (response intensity) changes in accordance with the various frequency components included in the impact. Specifically, it has been recognized that the frequency characteristic (response curve) of the resonance magnification when the gyro sensor is driven in the in-phase mode is represented as shown in FIG. 5. The resonance magnification is maximum at the resonant frequency fin in the in-phase mode. In the other frequency range around the in-phase-mode resonant frequency fin, the resonance magnification rapidly decreases with distance from the in-phase-mode resonant frequency fin. Note that, aside from the in-phase-mode resonant frequency fin, there is the anti-phase-mode resonant frequency fanti. At the anti-phase-mode resonant frequency fanti also, the resonance magnification increases to a degree, though the resonance magnification increased at the anti-phase-mode resonant frequency fanti is sufficiently smaller than the resonance magnification increased at the in-phase-mode resonant frequency fin. The vibration in the in-phase mode excited by the impact induces a movement which vibrates the two detection weights 32 and 33 in the opposite directions, i.e., vibration in the anti-phase mode to cause an output error as mentioned above.

As a result of performing intensive study, the present inventors have confirmed that, as the anti-phase-mode resonant frequency fanti is located closer to the in-phase mode resonant frequency fin, the resonance magnification at the resonant frequency fanti is larger. That is, as shown in FIG. 5, the resonance magnification peaks at the in-phase-mode resonant frequency fin and decreases thereabout. However, when the anti-phase-mode resonant frequency fanti is excessively close to the in-phase-mode resonant frequency fin, vibration in the anti-phase mode is induced, while vibration in the in-phase mode excited by the impact has not sufficiently been attenuated.

Therefore, it can be said that, by bringing the in-phase-mode resonant frequency fin and the anti-phase-mode resonant frequency fanti away from each other, it is possible to provide a region where the vibration in the in-phase mode excited by the impact has been sufficiently attenuated in the vicinity of the anti-phase-mode resonant frequency fanti and suppress the induction of the movement in the anti-phase mode. In addition, the frequency characteristic of the resonance magnification can be adjusted on the basis of the settings of not only the lengths of the springs which allow displacement in the z-axis direction and the like, i.e., the detection beams 42 and 43 and the turn-back beams 44a in the present embodiment, but also the length of the middle rigid body 44. On this basis, the present inventors adjusted the springs which allow displacement in the z-axis direction and the like and examined the frequency characteristic of the resonance magnification. As a result, by bringing the anti-phase-mode resonant frequency fanti away from the inphase-mode resonant frequency fin, the resonance magnification at the anti-phase-mode resonant frequency fanti could be reduced.

To bring the anti-phase-mode resonant frequency fanti away from the in-phase-mode resonant frequency fin, it is necessary for the detection weights 32 and 33 to move in synchronization to provide movements in the in-phase mode and in the anti-phase mode.

In a conventional gyro sensor, two detection weights which are not coupled to each other via a coupling spring and are completely separate from each other are provided or a completely integral detection weight is provided. Consequently, the detection weights move individually and independently and do not move in synchronization. Therefore, it is impossible to provide movements in the in-phase mode and in the anti-phase mode and separate the in-phase-mode resonant frequency fin from the anti-phase-mode resonant frequency fanti.

By contrast, in the present embodiment, the two detections weights 32 and 33 are coupled to each other via the coupling spring 44. As a result, it is possible to allow the detection weights 32 and 33 to move in synchronization and surely provide two pattern movements in the in-phase mode and in the anti-phase mode. Since the detection weights 32 and 33 move in synchronization, the detection weights 32 and 33 can have the in-phase-mode resonant frequency fin and the anti-phase-mode resonant frequency fanti. In addition, it is possible to separate the in-phase-mode resonant frequency fin from the anti-mode resonant frequency anti on the basis of the settings of not only the lengths of the detection beams 42 and 43 and the turn-back beams 44a, but also the length of the middle rigid body 44b. This can bring the anti-phase-mode resonant frequency fanti away from the in-phase-mode resonant frequency fin and reduce the resonance magnification at the anti-phase-mode resonant frequency fanti.

Here, a value (=(fanti−fin)/fanti)) obtained by dividing the difference between the anti-phase-mode resonant frequency fanti and the in-phase-mode resonant frequency fin by the anti-phase-mode resonant frequency fanti is defined as a decoupling ratio (hereinafter referred to as D.R.).

Figure 6:
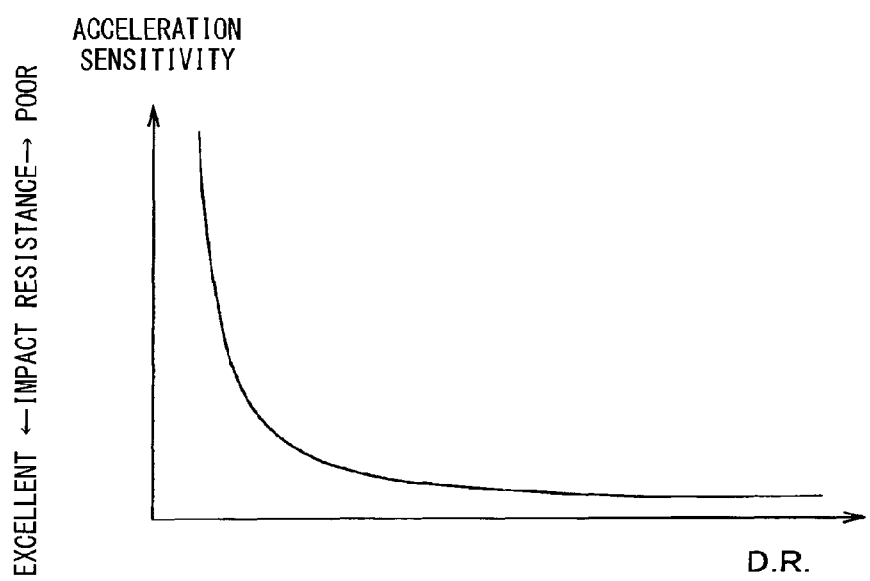
FIG. 6 is a graph showing the relationship between D.R. and an impact resistance.

Thus, as D.R. increases, the induction of the movement in the anti-phase mode can more reliably be suppressed. Consequently, it is possible to suppress an output error in the gyro sensor, improve the impact resistance, and perform more precise angular velocity detection. The relationship between D.R. and the impact resistance was specifically examined, and the result shown in FIG. 6 was obtained. From the graph also, it can be seen that, as the absolute value of D.R. increases, the impact resistance improves.

The increased D.R. can improve the impact resistance, but also incurs interference with a resonant mode at another frequency or a sensitivity reduction. Therefore, it is not preferable to merely increase D.R. Accordingly, it is preferable to adjust D.R. in an optimum range by preventing D.R. from increasing to an excessively large value, while preventing D.R. from decreasing to have a smaller value with approach to a region sensitive to the compact resistance, i.e., a region where the impact resistance abruptly deteriorates.

The adjustment of D.R. can be performed by setting not only the lengths of the detection beams 42 and 43 and the turn-back beams 44a, but also the length of the middle rigid body 44b, in the same manner with another resonant frequency. The following will describe the reason for this.

Figure 7:
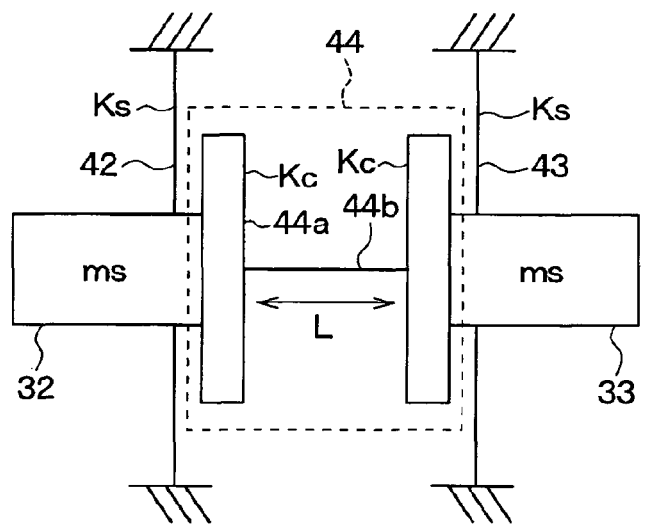
FIG. 7 is a schematic diagram showing the constants of the individual portions of the gyro sensor.

As shown in FIG. 7, when ms is the weight of each of the detection weights 32 and 33, ks is the spring constant of each of the detection beams 42 and 43, kc is the spring constant of each of the turn-back beams 44a, and L is the length of the middle rigid body 44b, the anti-phase-mode resonant frequency fanti and the in-phase-mode resonant frequency fin can be approximated as in Expressions 1 and 2. Note that, in Expressions 1 and 2, a and b are constants which satisfy b>a.

$$fin \approx \frac{1}{2\pi}\sqrt{\frac{A(ks + a/L \cdot kc)}{ms}} \quad \text{Expression 1}$$

$$fanti \approx \frac{1}{2\pi}\sqrt{\frac{A(ks + b/L \cdot kc)}{ms}} \quad \text{Expression 2}$$

Since D.R.=(fanti−fin)/fanti) is satisfied, when the anti-phase-mode resonant frequency fanti and the in-phase-mode resonant frequency fin which are represented by Expressions 1 and 2 are substituted in this expression, Expression 3 can be derived. This expression shows that, when each of ks and L increases, D.R. decreases and, when each of ks and L decreases, D.R. increases. This expression also shows that variations in D.R. are affected by ks/kc. When it is assumed that ks/kc=K is satisfied, Expression 3 can be transformed to Expression 4.

$$D.R. \approx \frac{\sqrt{ks + b/L \cdot kc} - \sqrt{ks + a/L \cdot kc}}{\sqrt{ks + b/L \cdot kc}} = 1 - \sqrt{\frac{ks/kc + a/L}{ks/kc + b/L}} \quad \text{Expression 3}$$

$$D.R. = 1 - \sqrt{\frac{1 + a/LK}{1 + b/LK}} \quad \text{Expression 4}$$

Expression 4 shows that a region where D.R. is smaller, i.e., L and K are larger is less affected by a/LK and b/LK under the square root symbol. Therefore, it can be seen that, even when K varies, D.R. is unlikely to vary.

Accordingly, by merely adjusting the length L of the middle rigid body 44b in addition to adjusting the lengths of the detection beams 42 and 43 and the turn-back beam 44a, D.R. can be adjusted.

Figure 8:
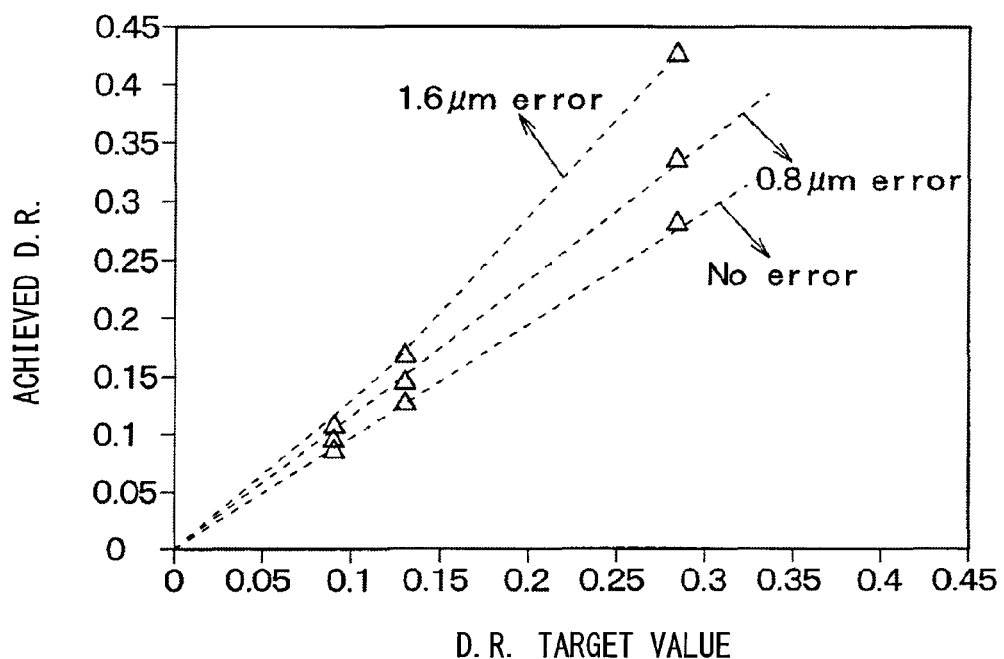
FIG. 8 is a diagram showing the relationship between a D.R. target value and achieved D.R.
Figure 9:
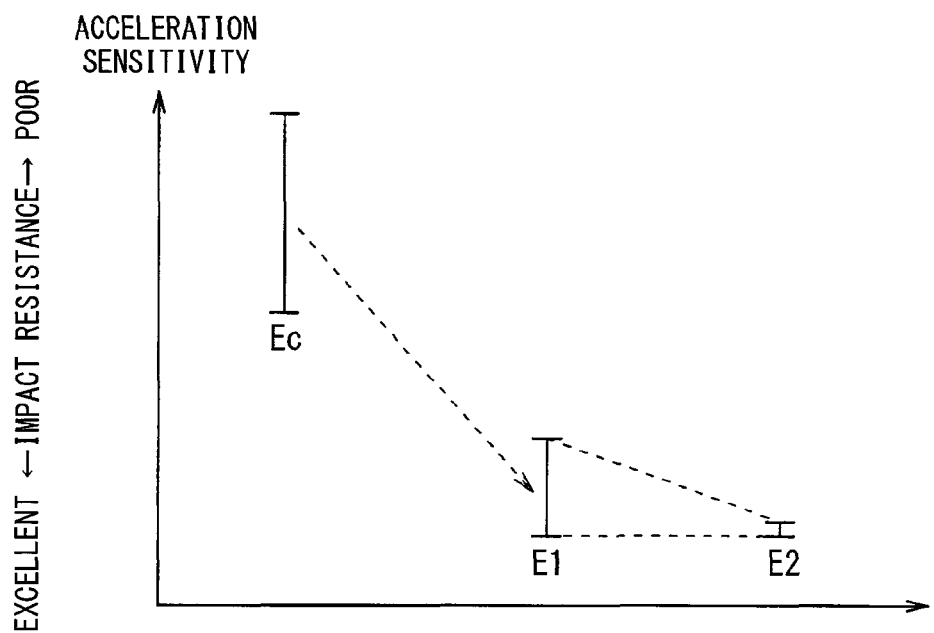
FIG. 9 is a diagram showing the result of examining variations in impact resistance in each of the cases where a conventional structure is used, where an in-phase-mode resonant frequency fin is separated from an anti-phase-mode resonant frequency fanti, and where a structure in which D.R. is less likely to vary is used.

When the gyro sensor is manufactured, due to variations in the working of the detection beams 42 and 43, variations from the target value of D.R. occur in the achieved value of D.R. when the gyro sensor is actually produced. As shown in FIG. 8, the result has been obtained that, as the target value of D.R. is smaller, the variations are smaller. Therefore, it is preferable to selectively set D.R. to a rather large value in consideration of the impact resistance and set D.R. to a rather small value so as to be able to suppress variations in the achieved D.R. If variations in the achieved D.R. can thus be suppressed, even when the target value of D.R. is set in the vicinity of the region sensitive to the impact resistance so as to improve the impact resistance, D.R. can be set to substantially the same value as the target value. Accordingly, it is possible to provide higher robustness in a region more sensitive to the impact resistance. Specifically, as shown in FIG. 9, when the detection weights 32 and 33 are coupled to each other via the coupling spring 44 to separate the in-phase-mode resonant frequency fin from the anti-phase-mode resonant frequency fanti (E1), it is possible to provide a higher impact resistance and more effectually suppress variations in impact resistance than in a conventional structure (Ec) in which the detection weights are not coupled to each other. When the detection weights 32 and 33 are coupled to each other via the coupling spring 44 to separate the in-phase-mode resonant frequency fin from the anti-phase-mode resonant frequency fanti and D.R. is further adjusted (E2), it is possible to much more effectually suppress variations in impact resistance and provide higher robustness.

As has been described above, in the gyro sensor in the present embodiment, the two detection weights 32 and 33 are coupled to each other via the coupling spring 44. This can separate the in-phase-mode resonant frequency fin from the anti-phase-mode resonant frequency fanti. As a result, it is possible to provide a gyro sensor which can suppress an output error on receiving an impact and can perform more precise angular velocity detection.

In addition, the coupling spring 44 is formed of the turn-back beams 44*a* each serving as a torsion spring and the middle rigid body 44*b*. As a result, it is possible to adjust D.R. by mere adjustment of the length L of the middle rigid body 44*b* and more easily and properly adjust D.R. than by adjusting the detection beams 42 and 43 and the turn-back beams 44*a*.

Second Embodiment

A second embodiment of the present disclosure will be described. The present embodiment is obtained by changing the configurations of the movable portion 30 and the beam portion 40 in the first embodiment as well as the directions of drive thereof. Since the second embodiment is otherwise the same as the first embodiment, only portions different from those in the first embodiment will be described.

Figure 10:
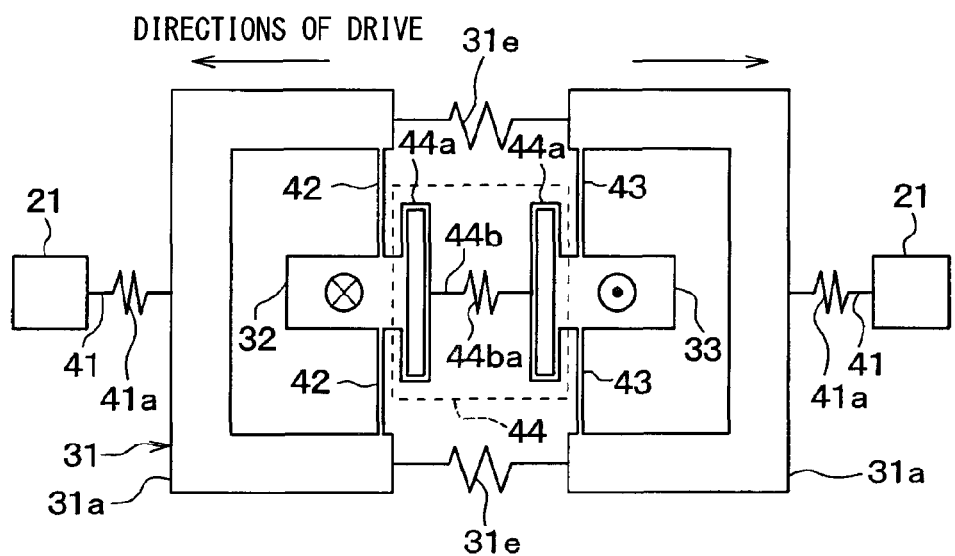
FIG. 10 is a plan diagram of a gyro sensor according to a second embodiment of the present disclosure.

As shown in FIG. 10, the outer drive weight 31 is formed in a frame shape, which is a rectangular frame shape herein, and divided into two parts arranged in the x-axis direction. The two parts of the divided outer drive beam 31 are coupled to each other via drive coupling springs 31*e*. The outer drive weight 31 is supported by the supporting fixed portions 21 via the support beam 41 and made movable in the x-axis direction (lateral direction along the surface of the paper sheet) by drive springs 41*a* provided in the support beam 41. Since the two parts of the divided outer drive beam 31 are coupled by the drive coupling springs 31*e*, the individual parts of the outer drive beam 31 more synchronously operate.

Figure 11:
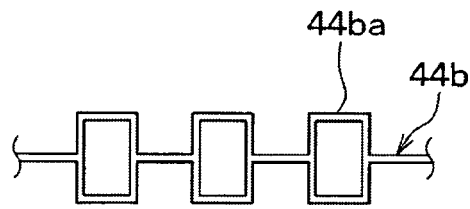
FIG. 11 is an enlarged plan diagram showing an example of each of drive coupling springs 31e and each of springs 44ba provided in a middle rigid body 44b.

The coupling spring 44 has basically the same configuration as in the first embodiment. However, since the outer drive weight 31 has been divided into the two parts, the middle rigid body 44*b* is configured to include a spring 44*ba* so as to allow the individual detection weights 32 and 33 to move in the xy-plane. The spring 44*ba* is designed to serve as a rigid body which is flexible in an xy plane direction and rigid in the z-axis direction so as to be able to allow the movement of each of the detection weights 32 and 33 in the xy plane and restrain the movement of each of the detection weights 32 and 33 in the z-axis direction. For example, as shown in FIG. 11, the spring 44*ba* can be formed of a turn-back beam having a frame shape. In this case, by reducing the length of the beam of the turn-back beam in a direction parallel with the y-axis direction, the rigidity in the direction of twist can be enhanced. Therefore, as described above, it is possible to restrain the movement of the detection weights 32 and 33 in the z-axis direction.

Note that, in FIG. 10, the driving fixed portions 22 and 23 and the driving movable electrodes 31*b* are omitted. The configuration in the second embodiment is different from the configuration in the first embodiment in that the base portions 22*a* and 23*a* and the comb-tooth-like driving fixed electrodes 22*b* and 23*b* which are provided in the driving fixed portions 22 and 23 are formed separately from the support beam 41, but is otherwise the same as the configuration in the first embodiment.

The gyro sensor can thus also be configured. In such a gyro sensor, as shown by the arrows in FIG. 10, the parts of the divided outer drive beam 31 are displaced oppositely in the x-axis direction to be driven/vibrated. In this manner, angular velocity detection can be performed. Since such a drive mode is used, the directions of drive are different from those in the first embodiment, but the operation is otherwise the same as in the first embodiment. In the gyro sensor thus configured also, by coupling the two detection weights 32 and 33 via the coupling spring 44, the same effect as obtained in the first embodiment can be obtained.

Third Embodiment

A third embodiment of the present disclosure will be described. The present embodiment is also obtained by changing the configurations of the movable portion 30 and the beam portion 40 in the first embodiment as well as the directions of drive thereof. Since the third embodiment is otherwise the same as the first embodiment, only portions different from those in the first embodiment will be described.

Figure 12:
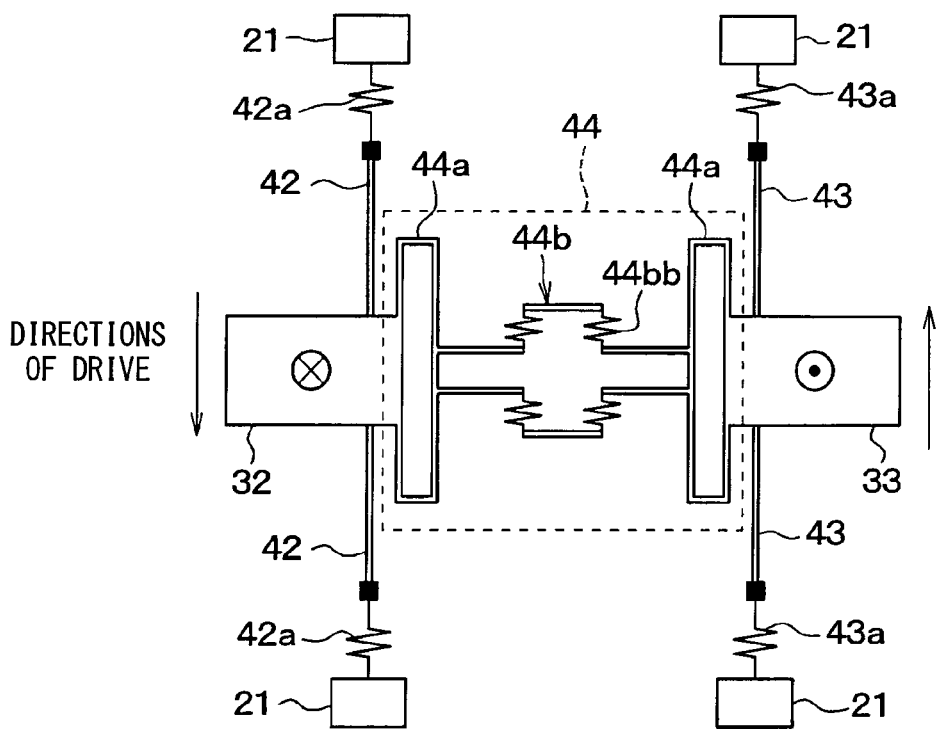
FIG. 12 is a plan diagram of a gyro sensor according to a third embodiment of the present disclosure.

As shown in FIG. 12, a configuration is provided in which the detection beams 42 and 43 are connected to the supporting fixed portions 21 and provided with drive springs 42*a* and 43*a* which allow movement in the y-axis direction (vertical direction along the surface of the paper sheet). Using the drive springs 42*a* and 43*a*, the detection weights 32 and 33 connected to the detection beams 42 and 43 are driven/vibrated in the y-axis direction to function also as drive weights. In other words, a structure is provided in which the detection weights 32 and 33 are configured integrally with the drive weights to be arranged in the x-axis direction.

The coupling spring 44 has basically the same configuration as in the first embodiment. However, since the detection weights 32 and 33 are configured to be movable in the y-axis direction, the middle rigid body 44*b* is provided with springs 44*bb* so as to allow each of the detection weights 32 and 33 to move in the y-axis direction. Each of the springs 44*bb* is designed to serve as a rigid body which is flexible in the y-axis direction and rigid in the z-axis direction so as to be able to allow the movement of each of the detection weights 32 and 33 in the y-axis direction and restrain the movement of each of the detection weights 32 and 33 in the z-axis direction.

Figure 13A:
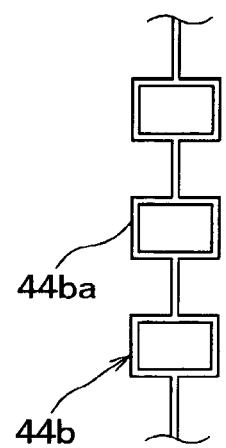
FIG. 13A is an enlarged plan diagram showing an example of drive springs 42a an 43a provided in detection beams 42 and 43.
Figure 13B:
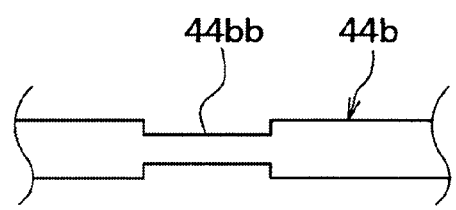
FIG. 13B is an enlarged plan diagram showing an example of each of springs 44bb provided in the middle rigid body 44b.

For example, as shown in FIG. 13A, each of the springs 44*bb* can be formed of a turn-back beam having a frame shape. In this case, by reducing the length of the beam of the turn-back beam in a direction parallel with the x-axis direction, the rigidity in the direction of twist can be enhanced. Therefore, as described above, it is possible to restrain the movement of the detection weights 32 and 33 in the z-axis direction. Alternatively, as shown in FIG. 13B, each of the springs 44*bb* may also be formed of a simple beam obtained by partially reducing the thickness of the middle rigid body 44*b* in the y-axis direction.

Note that, in FIG. 12, the driving fixed portions 22 and 23 and the driving movable electrodes 31*b* are omitted, but the driving movable electrodes 31*b* are provided in the detection weights 32 and 33 and the driving fixed electrodes 22b and 23b are provided so as to face the driving movable electrodes 31b. In the driving movable electrodes 31b, the support portions 31c are provided to extend in the y-axis direction and the comb-tooth-like electrodes 31d are provided to extend in the x-axis direction. In the driving fixed electrodes 22b and 23b also, the support portions 22c and 23c are provided to extend in the y-axis direction and the comb-tooth-like electrodes 22d and 23d are provided to extend in the x-axis direction. Thus, on the basis of electrostatic forces between the individual comb-tooth-like electrodes 22d, 23d, and 31d, the detection weights 22 and 23 can be driven/vibrated in parallel with the y-axis direction.

The gyro sensor can thus also be configured. In such a gyro sensor, the detections weights 32 and 33 are displaced oppositely in the y-axis direction to be driven/vibrated. Consequently, the directions of drive are different from those in the first embodiment, but the operation is otherwise the same as in the first embodiment. In the gyro sensor thus configured also, by coupling the two detection weights 32 and 33 via the coupling spring 44, the same effect as obtained in the first embodiment can be obtained.

Fourth Embodiment

A fourth embodiment of the present disclosure will be described. In the present embodiment, the gyro sensor in any of the first to third embodiments is included as one of the sensors in a composite sensor. Since the basic structure of the gyro sensor is the same as in each of the embodiments described above, only portions different from those in each of the embodiments described above will be described. Here, a composite sensor including the gyro sensor in the first embodiment will be described by way of example. However, the gyro sensor according to each of the second and third embodiments may also be used instead.

As shown in FIG. 14, a composite sensor S1 according to the present embodiment includes a second gyro sensor 200 and an acceleration sensor 400 in addition to the gyro sensor described in the first embodiment as a first gyro sensor 100, which are provided on the substrate 10 and integrated in one chip.

The second gyro sensor 200 is configured to have first and second vibrators 201 and 202. The vibrators 201 and 202 are configured to include detection weights 210 and 220, detection fixed electrodes 230 and 240, servo electrodes 231 and 241, drive weights 250 and 260, fixed electrodes 270 and 280, fixed portions 290 and 300, and the like.

Each of the detection weights 210 and 200 has a rectangular frame shape. The detection weights 210 and 200 have outer peripheral portions provided with detection movable electrodes 211 and 221 parallel with the x-axis. In addition, the detection fixed electrodes 230 and 240 and the servo electrodes 231 and 241 are placed around the detection weights 210 and 220 to face the respective detection movable electrodes 211 and 221.

On the other hand, the drive weights 250 and 260 are placed in the respective detection weights 210 and 220 each having the rectangular frame shape. In the present embodiment, each of the drive weights 250 and 260 has a block-like shape. The drive weights 250 and 260 have outer peripheral portions provided with drive movable electrodes 251 and 261 parallel with the x-axis. Additionally, the drive fixed electrodes 270 and 280 are placed around the drive weights 250 and 260, i.e., between the detection weights 210 and 220 and the drive weights 250 and 260 to face the drive movable electrodes 250 and 260.

In addition, the fixed portions 290 and 300 are placed between the detection weights 210 and 220 and the drive weights 250 and 260, and drive beams 291 and 301 couple the fixed portions 290 and 300 to the drive weights 250 and 260. Support beams 292 and 302 are placed between the detection weights 210 and 220 and the drive weights 250 and 260 to couple the detection weights 210 and 220 to the drive weights 250 and 260. Thus, the detection weights 210 and 220 and the drive weights 250 and 260 are supported by the fixed portions 290 and 300, the drive beams 291 and 301, and the support beams 292 and 302 to be in a floating state over the support substrate 11, while keeping a given distance from the support substrate 11.

In such a structure as described above, the portions of the detection weights 210 and 220 which face each other are formed with openings 214 and 224. As a result, the drive weights 250 and 260 placed inside the respective detection weights 210 and 220 face each other through the openings 214 and 224. Through the openings 214 and 224 of the detection weights 210 and 220, the drive weight 250 of the first vibrator 201 and the drive weight 260 of the second vibrator 202 are directly coupled to each other via a drive coupling spring 310.

In a structure of drive-inside/detection-outside type in which the detection weights 210 and 220 are placed outside the drive weights 250 and 260, the drive weights 250 and 260 are surrounded by the detection weights 210 and 220. Accordingly, by providing the detection weights 210 and 220 with the openings 214 and 224, it is possible to directly couple the drive weights 250 and 260 to each other via the drive coupling spring 310.

Between the detection weight 210 of the first vibrator 201 and the detection weight 220 of the second vibrator 202, the detection coupling spring 320 is placed to directly couple the detection weights 210 and 220 to each other. In the facing portions of the detection weights 210 and 220, one end of the opening 214 and one end of the opening 224 are directly coupled to each other by a detection coupling spring 320. On the other hand, the other end of the opening 214 and the other end of the opening 242 are directly coupled to each other by another detection coupling spring 320. This brings the drive coupling spring 310 into a state interposed between the detection coupling springs 320.

The second gyro sensor 200 thus configured operates as follows. First, when potential differences are produced between the drive fixed electrodes 270 and 280 and the drive movable electrodes 251 and 261, the drive weights 250 and 260 are displaced in the x-axis direction. As a result, when AC voltages at intended frequencies (typically the eigen frequencies of the vibrators 201 and 202) are applied to the drive fixed electrodes 270 and 280, the drive weights 250 and 260 vibrate at the frequencies.

At this time, the drive weights 250 and 260 drive the respective detection weights 210 and 220 in a drive direction (x-axis direction) such that the detection weight 210 of the first vibrator 201 and the detection weight 220 of the second vibrator 202 are in opposite phases (with a 180° phase difference). Thus, the detection weights 210 and 220 vibrate in the x-axis direction, similarly to the drive weights 250 and 260.

When an angular velocity around the z-axis perpendicular to each of the x-axis and the y-axis is applied while the detection weights 210 and 220 are thus vibrating in the x-axis direction, a Coriolis force is generated in the y-axis direction. The force displaces the detection weights 210 and 220 in the y-axis direction relatively to the drive weights 250 and 260. Since the detection weights 210 and 220 vibrate in opposite phases, the detection movable electrodes 211 and 221 are displaced in opposite directions by the Coriolis force when the angular velocity around the z-axis direction perpendicular to one surface of the substrate 10 is applied.

The respective amounts of displacement of the detection weights 210 and 220 are measured by detecting capacitance changes resulting from changes in the distances between the detection movable electrodes 221 and 221 and the detection fixed electrodes 230 and 240. That is, the capacitance changes between the detection movable electrodes 211 and 221 and the detection fixed electrodes 230 and 240 are sensed and a voltage corresponding to a servo force is applied to each of the servo electrodes 231 and 241 so as to suppress the capacitance changes. From the voltage corresponding to the servo force, the angular velocity can be obtained. Thus, using the second gyro sensor 200, the acceleration around the z-axis in the xy plane can be detected.

On the other hand, the acceleration sensor 400 is configured to have a movable portion 410, fixed portions 420, and vibration springs 430.

The movable portion 410 is configured to have a movable weight 411 and movable electrodes 412. The rectangular movable weight 411 has two facing sides provided with the respective comb-tooth-like movable electrodes 412.

The fixed portions 420 are configured to be supported by the support substrate 11 and have comb-tooth-like fixed electrodes 421 corresponding to the movable electrodes 412. The movable electrodes 412 and the fixed electrodes 421 are placed to be spaced apart at predetermined distances to have capacitances formed therebetween. In the case of the present embodiment, the movable electrodes 412 and the fixed electrodes 421 are provided to extend along the x-axis direction.

The vibration springs 430 connect the movable weight 411 to support fixed portions 431 at, e.g., the two sides of the movable weight 411 different from the two sides thereof formed with the movable electrodes 412. This allows the movable portion 410 to be displaced in the y-axis direction.

Upon application of an acceleration having a component parallel with the x-axis direction to the acceleration sensor 400 thus configured, the movable portion 410 is resultantly displaced to change the distances between the movable electrodes 412 and the fixed electrodes 421 and change the capacitances formed therebetween. Accordingly, potential differences are produced between the fixed portions 420 and the support fixed portions 431 to produce potential differences between the movable electrodes 412 and the fixed electrodes 421. By causing the capacitance changes therebetween to be output, the acceleration in the y-axis direction can be detected.

By thus providing the substrate 10 with the second gyro sensor 200 and the acceleration sensor 400 in addition to the first gyro sensor 100, one-chip integration can be achieved. In such a case of detecting an angular velocity in a circumferential direction (e.g., a roll direction in a vehicle) around an axis parallel with the xy plane by displacing the detection weights 32 and 33 in the z-axis direction as in the first gyro sensor 100, each of the components of the first gyro sensor 100 can be formed in the xy plane.

By contrast, in the case of detecting an angular velocity in a circumferential direction around an axis parallel with the xy plane supposedly in such a structure as that of the second gyro sensor 200, each of the components of the gyro sensor 200 should be formed in a plane parallel with the z-axis. As a result, a chip in which the second gyro sensor 200 is formed needs to be placed upright in the xy plane. Consequently, in the case of detecting two angular velocities which are an angular velocity in a circumferential direction around an axis parallel with the xy plane and an angular velocity around the z-axis direction using such a structure as that of the second gyro sensor 200, the individual sensors should be placed in different chips and cannot be integrated in one chip.

Accordingly, by using the structure of the first gyro sensor 100 as in the present embodiment, it is possible to provide a composite sensor which allows the first gyro sensor 100 to be integrated in one chip with the second gyro sensor 200 and the acceleration sensor 400. This allows the composite sensor to be more simplified than in the case where the individual sensors are formed in different chips.

Other Embodiments

Each of the embodiments described above has described the case where the SOI substrate is used as the substrate 10. However, this shows an example of the substrate 10, and a substrate other than the SOI substrate may also be used. Since the SOI substrate is used as the substrate 10, the detection electrodes 14 are provided on the support substrate 11. However, it is sufficient for the detection electrodes 14 to be placed at positions spaced apart at predetermined distances from the detection weights 32 and 33 in the z-axis direction. Accordingly, the detection electrodes 14 may also be placed on the front side of the detection weights 32 and 33.

The mass portion 31a placed outside the detection weights 32 and 33 has an annular shape, but may also have another frame shape, e.g., a quadrilateral frame shape. When the mass portion 31a is driven/vibrated, the mass portion 31a is reciprocally rotationally vibrated. However, the mass portion 31a may also be reciprocally vibrated in the y-axis direction.

In each of the embodiments described above, the gyro sensor of drive-outside/detection-inside type in which the detection weights 32 and 33 are placed in the outer drive weight 31 has been shown by way of example. However, this shows only an example, and the present disclosure is also applicable to, e.g., the structure described as the second gyro sensor 200 in the fourth embodiment, i.e., a gyro sensor of drive-inside/detection-outside type in which the detection weights are placed outside the drive weight.

The gyro sensor described above is also applicable to, e.g., a gyro sensor which performs angular velocity detection in a roll direction in a vehicle or the like.

According to the description given above, as an embodiment of the present disclosure, the gyro sensor includes the substrate 10 including the fixed portion 20, the movable portion 30, the two detection weights 32 and 33, the coupling spring 44, and the detection electrodes 44. The movable portion 30 is connected to the fixed portion 20 via the support beam 41 and includes the drive weight 31 having the mass portion 31a which is reciprocally vibrated, in the detection of an angular velocity, either rotationally in an xy plane as a plane parallel with a planar surface of the substrate 10 and including an x-axis and a y-axis orthogonal to the x-axis or in a y-axis direction as a direction along the y-axis on the basis of a displacement of the support beam 41. The two detection weights 32 and 33 are connected to the drive weight 31 via the detection beams 42 and 43 and arranged in an x-axis direction as a direction along the x-axis. The coupling spring 44 couples the two detection weights 32 and 33 to each other. The detection electrodes 14 are placed to be spaced apart at predetermined distances from the two detection weights 32 and 33 in a z-axis direction as a direction along a z-axis perpendicular to the xy plane. As a result of an application of the angular velocity, the two detection weights 32 and 33 are vibrated oppositely in the z-axis direction to cause changes in the respective distances between the two detection weights 32 and 33 and the detection electrodes 44 and cause anti-phase changes in the capacitance values of the two capacitors formed between the two detection weights 32 and 33 and the detection electrodes 44.

According to an embodiment of the present disclosure, the gyro sensor includes a substrate including the fixed portion 21, a movable portion, the two drive weights 31, the coupling spring 44, and detection electrodes. The movable portion is connected to the fixed portion 21 via the detection beams 42 and 43 and includes the detection weights 32 and 33 each having a mass portion which is reciprocally vibrated, in the detection of an angular velocity, either rotationally in an xy plane as a plane parallel with a planar surface of the substrate and including an x-axis and a y-axis orthogonal to the x-axis or in a y-axis direction as a direction along the y-axis on the basis of a displacement of each of the detection beams. The two drive weights 31 are formed integrally with the detection weights 32 and 33 and arranged in an x-axis direction as a direction along the x-axis. The coupling spring 44 couples the two detection weights 32 and 33 to each other. The detection electrodes are placed to be spaced apart at predetermined distances from the two detection weights 32 and 33 in a z-axis direction as a direction along a z-axis perpendicular to the xy plane. In the gyro sensor, as a result of an application of the angular velocity, the two detection weights 32 and 33 are vibrated oppositely in the z-axis direction to cause changes in the respective distances between the two detection weights 32 and 33 and the detection electrodes and cause anti-phase changes in the capacitance values of two capacitors formed between the two detection weights 32 and 33 and the detection electrodes.

It is understood that the present disclosure has been described in accordance to the embodiments, but the present disclosure is not limited to the embodiments and the structures thereof. The present disclosure also encompasses variations in the equivalent range as various modifications. In addition, embodiments and various combinations, and further, only one element thereof, less or more, and the form and other combinations including, are intended to fall within the spirit and scope of the present disclosure.

The invention claimed is:

1. A gyro sensor comprising:
a substrate including a fixed portion;
a movable portion connected to the fixed portion via a support beam and including a drive weight having a mass portion, wherein a plane being parallel with a planar surface of the substrate and including an x-axis and a y-axis orthogonal to the x-axis is referred to as an xy plane, a direction along the x-axis is referred to as an x-axis direction, and a direction along the y-axis is referred to as a y-axis direction, and wherein, when an angular velocity is detected, the mass portion is reciprocally rotationally vibrated in the xy plane or reciprocally vibrated in the y-axis direction on the basis of a displacement of the support beam;
two detection weights connected to the drive weight via detection beams and arranged in the x-axis direction;
a coupling spring coupling the two detection weights to each other; and detection electrodes placed to be spaced apart at predetermined distances from the two detection weights in a z-axis direction as a direction along a z-axis perpendicular to the xy plane,
wherein it is configured that, as a result of an application of the angular velocity, the two detection weights are vibrated oppositely in the z-axis direction to cause changes in the respective distances between the two detection weights and the detection electrodes and cause anti-phase changes in capacitance values of two capacitors formed between the two detection weights and the detection electrodes and, on the basis of the anti-phase changes in the capacitance values, the angular velocity is detected using a differential output of signals showing the changes in the two capacitance values, and
wherein the coupling spring includes torsion springs connected respectively to the two detection weights, and a middle rigid body coupling the torsion spring connected to one of the detection weights to the torsion spring connected to the other detection weight.

2. The gyro sensor according to claim 1, wherein each of the two detection weights has a cantilever structure in which one of two end portions of each detection weight is supported by and connected to a respective detection beam and, when the angular velocity is applied, the respective detection beam is used as a node to displace a one of the end portions of each detection weight that is opposite to the end portion connected to the respective detection beam.

3. The gyro sensor according to claim 2, wherein each of the two detection weights is connected to the respective detection beam on a side of each detection weight that is closer to a center of the mass portion.

4. The gyro sensor according to claim 1,
wherein the fixed portion includes driving fixed electrodes,
wherein the movable portion includes driving movable electrodes provided at an outer periphery of the mass portion configured to have an annular shape, and
wherein, during the detection of the angular velocity, electrostatic attraction forces are generated between the driving fixed electrodes and the driving movable electrodes to rotationally vibrate the drive weights about a center of the mass portion as a rotation center.

5. A composite sensor comprising:
a first gyro sensor which is the gyro sensor according to claim 1;
a second gyro sensor formed on the substrate to detect an angular velocity around the z-axis in the xy plane; and
an acceleration sensor formed on the substrate to detect an acceleration in one direction parallel with the xy plane,
wherein the first gyro sensor, the second gyro sensor, and the acceleration sensor are integrated in one chip.

6. The gyro sensor according to claim 1, wherein the two detection weights are spaced apart and symmetrical, and the coupling spring is located between the detection weights.

7. The gyro sensor according to claim 6, wherein the torsion springs are spaced apart and the middle rigid body is located between the torsion springs.

8. The gyro sensor according to claim 6, wherein each of the torsion springs has a rectangular-frame shape.

9. A gyro sensor comprising:
a substrate including a fixed portion;
a movable portion connected to the fixed portion via detection beams and including two detection weights each having a mass portion, wherein a plane being parallel with a planar surface of the substrate and including an x-axis and a y-axis orthogonal to the x-axis is referred to as an xy plane, a direction along the x-axis is referred to as an x-axis direction, and a direction along the y-axis is referred to as a y-axis direction, and wherein, when an angular velocity is detected, the mass portion is reciprocally rotationally rotated in the xy plane or reciprocally vibrated in the y-axis direction on the basis of a displacement of each of the detection beams;

two drive weights formed integrally with the two detection weights and arranged in the x-axis direction;

a coupling spring coupling the two detection weights to each other; and detection electrodes placed to be spaced apart at predetermined distances from the two detection weights in a z-axis direction as a direction along a z-axis perpendicular to the xy plane, wherein it is configured that, as a result of an application of the angular velocity, the two detection weights are vibrated oppositely in the z-axis direction to cause changes in the respective distances between the two detection weights and the detection electrodes and cause anti-phase changes in capacitance values of two capacitors formed between the two detection weights and the detection electrodes and, on the basis of the anti-phase changes in the capacitance values, the angular velocity is detected using a differential output of signals showing the changes in the two capacitance values, and wherein the coupling spring includes torsion springs connected respectively to the two detection weights, and a middle rigid body coupling the torsion spring connected to one of the detection weights to the torsion spring connected to the other detection weight.

10. The gyro sensor according to claim 9, wherein the two detection weights are spaced apart and symmetrical, and the coupling spring is located between the detection weights.

11. The gyro sensor according to claim 10, wherein the torsion springs are spaced apart and the middle rigid body is located between the torsion springs.

12. The gyro sensor according to claim 10, wherein each of the torsion springs has a rectangular-frame shape.

13. The gyro sensor according to claim 9, wherein each of the two detection weights has a cantilever structure in which one of two end portions of each detection weight is supported by and connected to a respective one of the detection beams, and when the angular velocity is applied, the respective detection beam is used as a node to displace a one of the end portions of each detection weight that is opposite to the end portion connected to the respective detection beam.

14. The gyro sensor according to claim 13, wherein the one of two end portions of the detection weight supported by the respective detection beam is closer to the corresponding torsion spring of the coupling spring than the other of the two end portions of each detection weight.

\* \* \* \* \*